May 1, 1934.  C. H. WHITE  1,956,845
DISK HARROW
Filed July 12, 1928   3 Sheets-Sheet 2
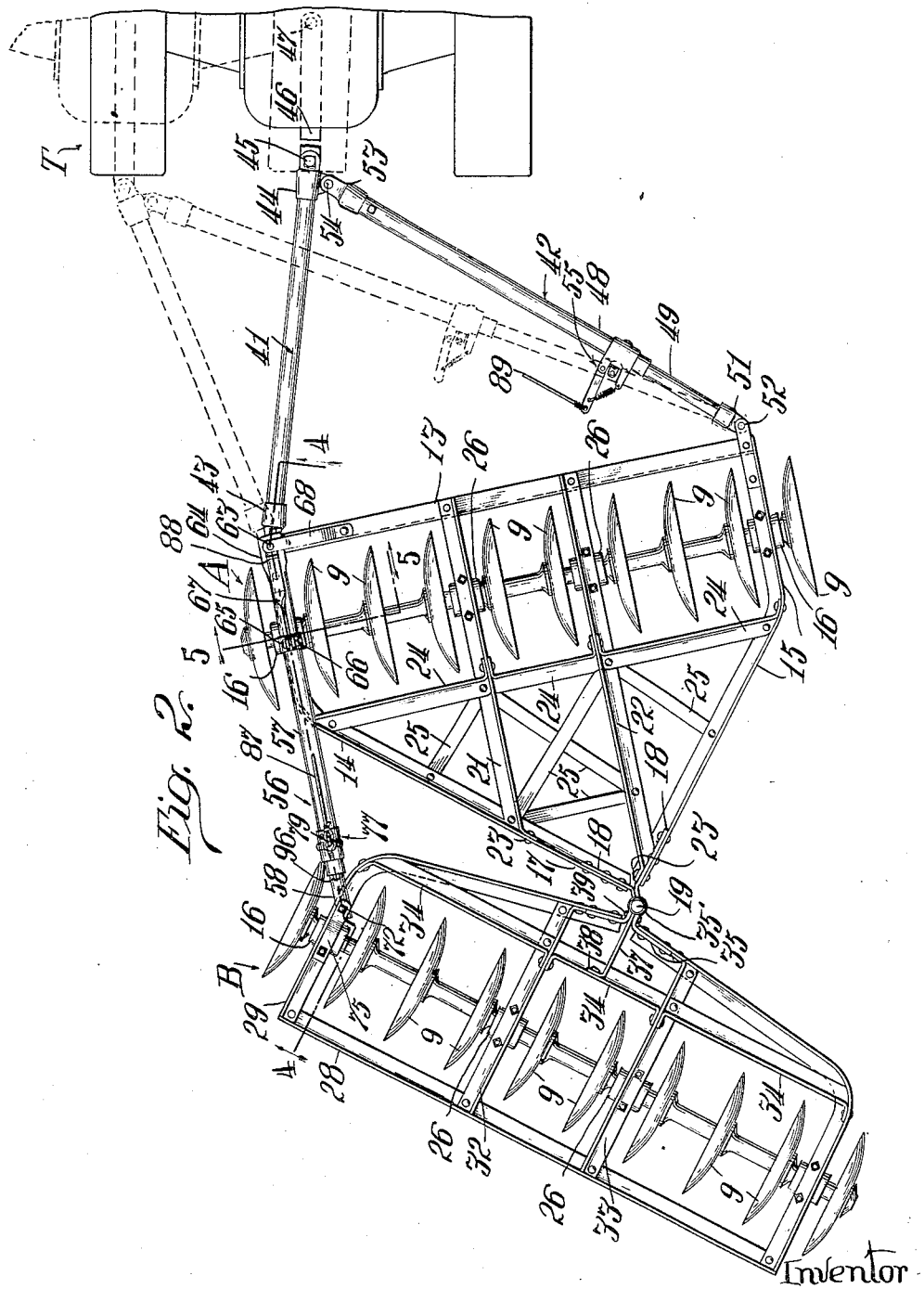
Inventor
Charles H. White,
By Brown, Jackson, Boettcher & Dienner.
Attorneys
Witness
Milton Lenoir

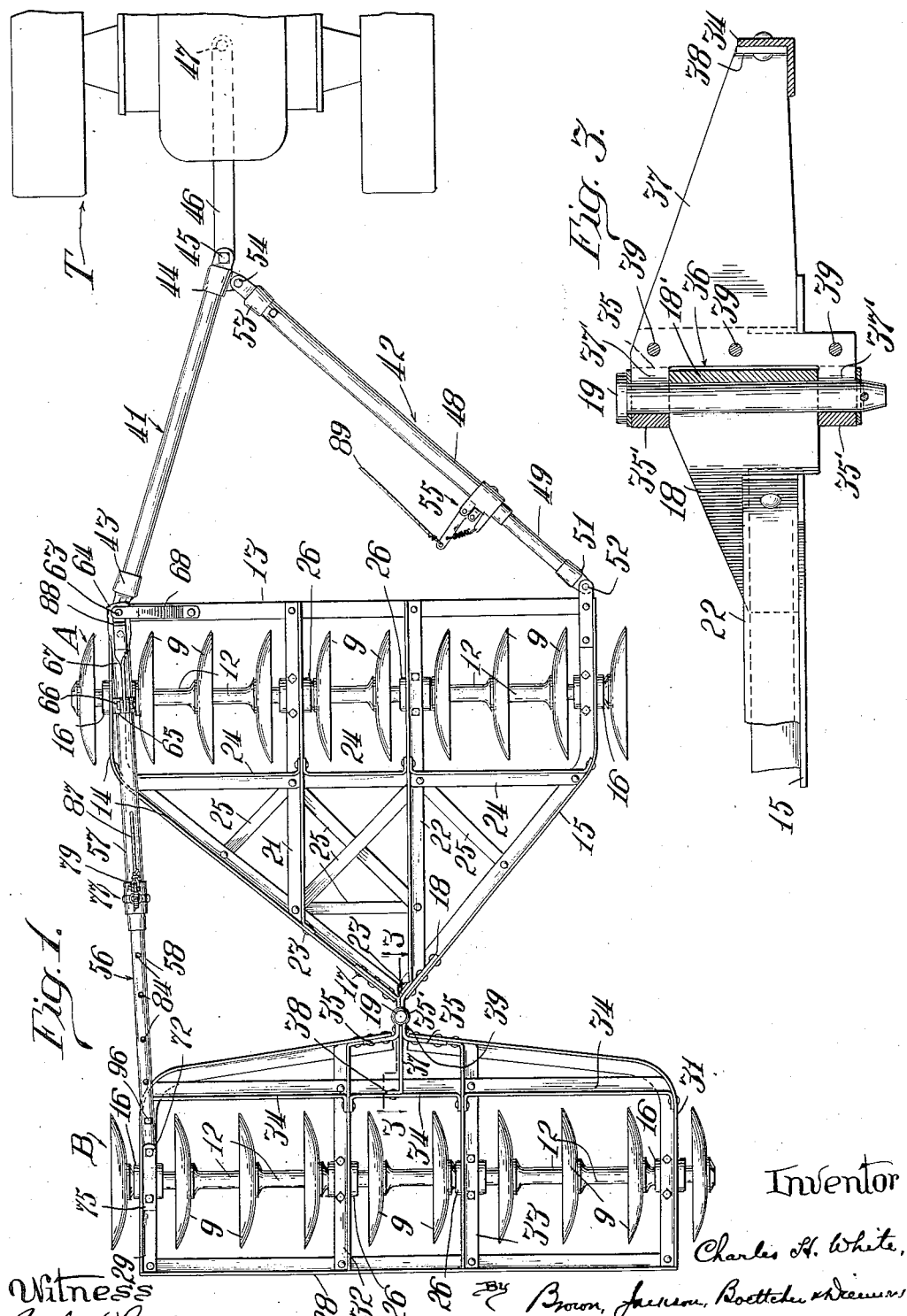

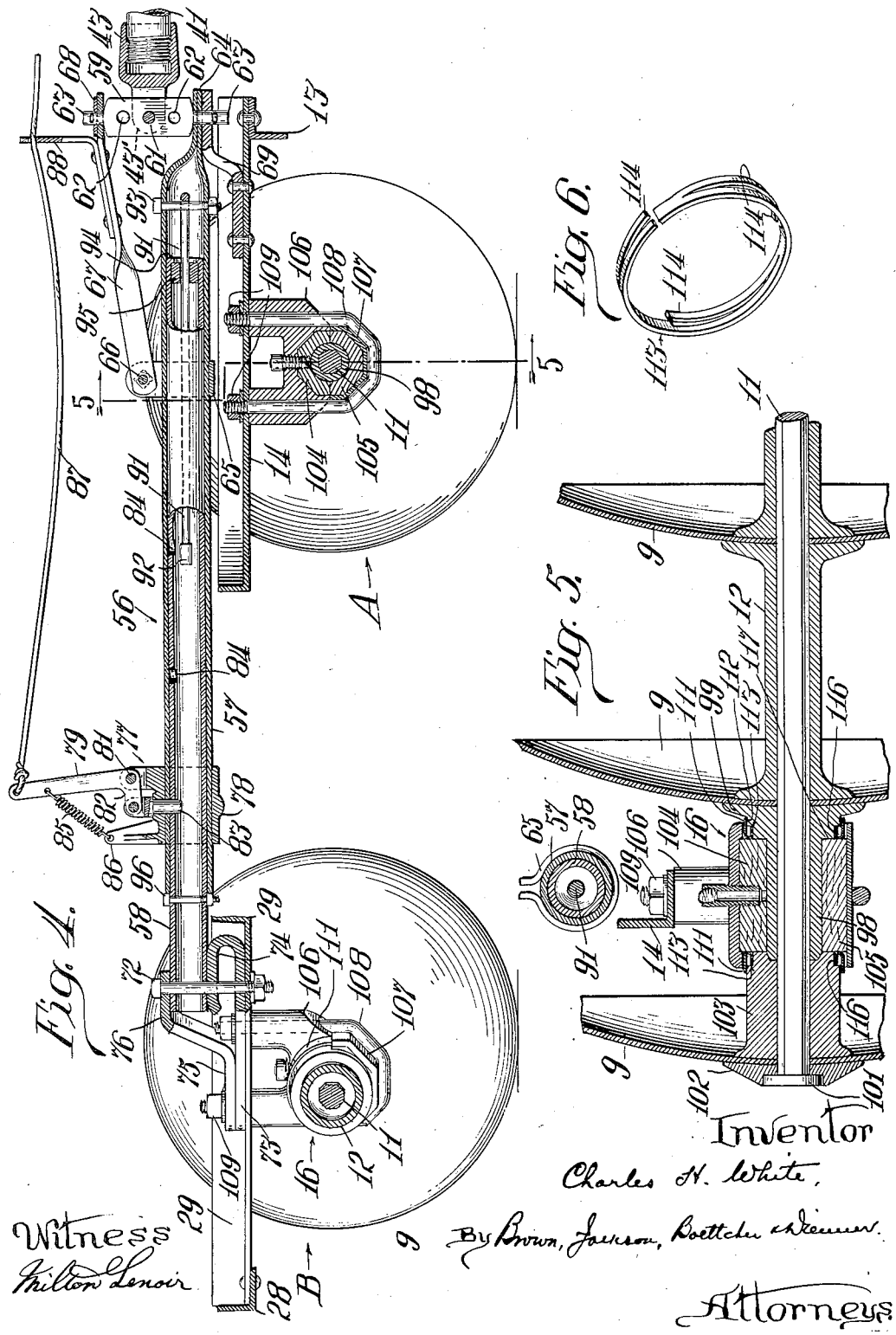

Patented May 1, 1934

1,956,845

UNITED STATES PATENT OFFICE 1,956,845

DISK HARROW

Charles H. White, Moline, Ill., assignor to Deere & Company, Moline, Ill., a corporation of Illinois Application July 12, 1928, Serial No. 292,093

22 Claims. (Cl. 55—83)

The present invention relates to disk harrows of the tandem gang type, such as are adapted primarily for tractor propulsion. Certain features of the invention have particular reference to harrows of the so-called single tandem or "offset" type wherein the harrow, when working, travels in a position diagonally in rear and to one side of the tractor, as for cultivating under the overhanging branches of trees in orchard work, or for cultivating close to fence lines and ditches, and up into the corners of the field, etc., and, accordingly, I shall describe the invention in this embodiment.

One of the particular objects of the invention is to provide improved mechanism for adjusting the offset relation of the entire harrow with respect to the tractor, and also to provide improved mechanism for adjusting the angle between the front and rear gangs for any given offset position of the harrow. A feature of these adjusting mechanisms is an arrangement whereby both adjustments may be quickly and easily effected from the operator's position on the tractor while the implement is in operation, thereby avoiding the necessity of the operator stopping the implement, dismounting from the tractor and performing either or both of such adjustments by a laborious manual operation. In this regard, the two adjusting mechanisms possess the further advantage of being able to utilize the power of the tractor in effecting both adjustments, the tractor being either backed or driven forwardly, depending upon the adjustment to be performed. Another advantage of these adjusting mechanisms resides in their strength and rigidity to sustain the draft stresses transmitted from the tractor to the implement, and from the front gang to the rear gang. This desired strength is obtained by constructing each adjusting mechanism of two cooperating tubular bars which have relative telescopic engagement, one within the other, and which are capable of sliding freely while still sustaining heavy compression or tension stresses; incident to effecting the aforesaid adjustments. In this regard, the invention also embodies improved means for preventing accidental separation of the two telescopic bars, such as might otherwise result from excessive elongation of the adjusting mechanism.

Another object of the invention is to provide an improved angling or pivot relation between the front and rear gangs whereby accurate registration is maintained between the two gangs during all working adjustments of the gangs. It will be understood that by registration I have reference to that desired operating condition wherein the disks of the rear gang split the ridges left between the disks of the front gang, i. e., travel directly between the lines of cultivation of the front disks. Ordinarily it is difficult to retain this registration in different working adjustments of the harrow owing to the fact that the angle of the rear gang to the line of advance is nearly always more acute than the angle of the front gang to the line of advance, such being necessitated because the front gang is cutting into unworked soil whereas the rear gang is cutting into soil which has been partly loosened by the front gang, and hence the rear gang must be disposed at a sharper cutting angle to maintain the desired stability or equilibrium between the gangs. Because of this differential relation between the cutting angle of the two gangs relatively to the line of advance, the disks of the rear gang must be spaced further apart than the disks of the front gang in order to secure an approximate degree of registration.

The invention has as one of its objects to maintain this registration during adjustments of the harrow, by having the angling movement between the gangs occur around a pivot center which has a particular location relative to the gangs, preferably intermediate the ends of the gangs and in relatively close proximity to the axis of the rear gang. By virtue of such location of this pivot center, the tendency of the angling adjustments to disturb registration is reduced to a minimum, notwithstanding the fact that the disks of the rear gang are spaced further apart than are the disks of the front gang.

The pivotal connection referred to also embodies improved features of construction whereby a long vertical bearing is obtained which holds the two gangs against relative lateral tipping. The adjustable draft connection which determines the relative cutting angle between the two gangs is preferably connected to the two gangs adjacent to the inner ends thereof.

A further object of the invention is to provide an improved construction and arrangement of dust excluding rings for preventing the entrance of dirt and dust to the bearings in which the rotatable disks are supported.

Other objects and advantages of the invention will appear in the following detailed description of a preferred embodiment thereof:

In the accompanying drawings illustrating such embodiment:

Fig. 1 is a plan view illustrating the two gangs in parallel relation, corresponding to a transport condition of the harrow;

Fig. 2 is a similar view illustrating the gangs angled in working relation, and also illustrating in dotted lines a further offset adjustment of the harrow with respect to the tractor;

Fig. 3 is a detail sectional view through the pivot connection between the two gangs, corresponding to a section taken on the plane of the line 3—3 of Fig. 1 and looking in the direction indicated by the arrows;

Fig. 4 is a longitudinal sectional view through the gang angling draft member, corresponding to a section taken on the plane of the line 4—4 of Fig. 2, with the gangs in angled relation;

Fig. 5 is a detail sectional view through a bearing of one of the gangs, taken on the planes of the lines 5—5 of Fig. 2 and of Fig. 4; and Fig. 6 is a perspective view of the expansion ring which is employed in each of these bearings.

I shall first describe the frames of the two gangs, together with their pivotal connection, and shall then describe the adjustable draft members, the dust excluding rings, etc. The disks 9 of both gangs are of the usual concavo-convex design, with the disks of the front gang A having their concave sides facing outwardly with respect to the offset relation of the harrow, and the disks of the rear gang B having their concave sides facing inwardly. The assembly of the disks in gang form is substantially duplicated in the case of both gangs, such assembly comprising a polygonal rod or shaft 11 (Fig. 5) on which all of the disks are mounted, together with spacing sleeves or spools 12 interposed between the disks and holding the same in spaced relation on the shaft or rod 11.

The frame of the front gang A comprises a front frame bar 13, preferably of angle section, which extends almost to the outer ends of the gang. A side frame bar 14 is rigidly secured to the inner end of the front frame bar 13, and a similar side frame bar 15 is also secured to the outer end of the front bar 13. The forward portions of the two bars 14 and 15 extend rearwardly in parallelism between the two outermost disks at each end of the gang, and these portions of the two frame bars support bearings 16, to be hereinafter described, in which the shaft 11 has rotatable bearing support. The rear portions of the side frame bars 14—15 are converged or brought together to form an apex-shaped frame extension 17.

The ends of the said bars are joined to the opposite ends of a plate 18 which constitutes one of the bearing members of the pivotal coupling 19 which connects the front and rear gangs. The intermediate portion of the plate 18 is formed with a loop which encircles the pivot pin, as will be presently described, and the end portions thereof are extended up along the inner sides of the vertical flanges of the frame bars 14—15, to which the ends of the plate 18 are rigidly secured. The intermediate portion of the frame is reenforced by two longitudinally extending frame bars 21 and 22 which are riveted at their front ends to the front frame bar 13, and which have their vertical flanges bent inwardly at the rear ends for riveting to the vertical flanges of the side frame bars, as indicated at 23. Transverse brace bars 24—24 are interposed between the side bars 14—15 and the two intermediate bars 21—22 in the relation shown, the ends of these transverse bars having their vertical flanges bent forwardly for riveting to the aforesaid frame bars. Diagonal and transverse bars or straps 25 form a reenforcing lattice work between the side and intermediate frame bars. The two intermediate frame bars 21 and 22 support bearings 26 in which the shaft 11 is journaled, the details of which bearings will be apparent from the later description of Fig. 5.

The frame of the rear gang B comprises a rear frame bar 28, to the ends of which are secured side frame bars 29 and 31, the latter extending forwardly between the outermost pair of disks at each end of the gang and supporting bearings 16 in which the shaft 11 of this rear gang is journaled, corresponding, in general relation, to the construction described of the front gang A. The front portions of the two bars 29 and 31 are converged together for effecting attachment to the pivotal coupling 19, such shaping of the bars also forming a relatively short apex-shaped extension frame at the front end of this rear gang frame. Two longitudinally extending intermediate frame bars 32 and 33 have their ends secured to the rear frame bar 28 and to the front portions of the side frame bars 29—31, these intermediate frame bars also carrying intermediate bearings 26 for the shaft 11 of the rear gang. Transverse brace bars 34 extend between the main bars of the frame in substantially the same relation as described of the brace bars 24 of the front frame.

The converged ends of the frame bars 29—31 are riveted to the ends of a plate 35 which forms the other section of the pivotal coupling 19. The intermediate portion of said plate extends forwardly from between the ends of the frame bars and has a loop 35′ formed therein for receiving the pivot pin 19.

Referring to Fig. 3, it will be seen that this looped portion of the plate 35 is notched out between its upper and lower portions, as indicated at 36, to accommodate the loop 18′ of the other plate 18. The upper and lower bearing portions 35′ of the plate 35 thus embrace the upper and lower portions of the pivot pin 19, and the loop 18′ of the other plate embraces the intermediate portion of the pivot pin between these upper and lower bearing portions 35′. The pin 19 is relatively long, with the bearing portions 35′ engaging widely separated points thereof and with the intermediate bearing portion 18′ engaging along a considerable length of the pin between the upper and lower bearing portions, and as a result of this construction a pivotal coupling is afforded which will effectively prevent lateral tipping of one gang relatively to the other and which will effectively prevent downward sagging between the frames at their point of pivotal coupling. Additional strength is given this coupling by the provision of a bracing strut or plate 37 which has a laterally bent flange 38 at its rear end, secured to the transverse brace bar 34, and which has its front end extending between the forwardly projecting side portions of the plate 35 to act as a stiffener therefor. The strut 37 is rigidly secured between the side portions of the plate 35, as by the rivets 39, and said strut has forwardly extending tongue portions 37′ which reenforce the looped portions 35′ and which also provide shoulders bearing on the upper and lower ends of the looped portion 18′ for reenforcing the pivotal coupling against sagging weight.

When cultivating hard ground, it is frequently necessary to impose weight on the harrow, in the form of stones, bags of sand or the like, which are placed on the rear frame between the transverse brace bars 34 and the front bars of the frame, and which may also be placed on the apex-shaped frame extension 17 of the front gang. The relatively long pivotal coupling between the two frames is adequate to support such additional weight, and aids in holding the two gangs to their work by transmitting downwardly acting forces between the two frames.

The draft pull of the tractor T is transmitted to the harrow through two draft bars 41 and 42 which are pivotally connected to the extremities of the front frame and extend forwardly therefrom in triangular relation. The draft bar 41 consists of a fixed length of pipe stock having a cap 43 screwed over the rear end thereof, such cap establishing pivotal connection with the inner end of the front frame. A similar cap 44 screws over the front end of the bar 41, and has pivotal connection at 45 with a draw bar 46 extending rearwardly from the tractor T. The draw bar is preferably pivoted to the tractor, as indicated at 47, for lateral swinging movement. The other draft bar 42 is extensible and contractible for adjusting the harrow, and comprises an outer section of pipe stock 48 and an inner section 49, also preferably constructed of pipe stock, which has telescopic sliding engagement within the outer section 48.

The rear end of the inner section 49 has a cap 51 screwed over the same, which cap is pivotally connected at 52 to the forwardly projecting end of the side frame bar 15. The front end of the outer bar section 48 has a cap 53 screwing over the same, which is pivotally connected at 54 to a lug projecting from the cap 44 on the other draft bar 41. It will be understood that the draft bar 42 may be pivotally coupled directly to the draw bar 46 of the tractor, but the construction shown is preferred. The relative telescopic movement between the outer and inner sections 48 and 49 of the draft bar 42 is controlled by latch mechanism generally indicated at 55, the details of which will be hereinafter explained in connection with the description of the adjustable draft rod which extends between the inner ends of the two gangs.

This other adjustable draft rod is indicated generally at 56, and comprises an outer tubular section 57 within which telescopes an inner tubular section 58. Referring now to Fig. 4, it will be seen that the rear end of the rigid draft bar 41 is connected to the frame of the front gang through the instrumentality of a swiveled pivot block 59, which also affords a pivotal mounting for the front end of the gang angling adjusting bar 56. The cap 43 has lugs or a bifurcated end 43' which embraces the sides of the pivot block 59 and has pivotal mounting thereon on a transverse pin 61 whereby the rigid draft bar 41 can swing upwardly and downwardly with reference to the pivot block 59.

A plurality of holes 62 are provided at different vertically spaced points in the block for positioning the pivot pin 61 at different heights. The block has verticaly extending pintle ends 63 having suitable bearing support, whereby the block can swivel around a substantially vertical axis as the angle between the harrow and the front draft connections varies or is adjusted. The front end of the outer telescopic bar section 57 is flattened, as indicated at 64, and the lower pintle 63 extends down through an aperture in this flattened portion. A clamping band 65 is fixedly secured around the bar section 57 at a point in rear of the pivot block 59, and secured between the spaced upper ends of such band on a bolt 66 is a bar 67 which has its forwardly extending end twisted and provided with an aperture for receiving the upper pintle 63 of the pivot block. Referring to Fig. 1, a heavy strap or bar 68 is rigidly secured to the bar 13 of the front frame and is bent upwardly and apertured to engage over the upper pintle 63, above the bar 67. A pivot bracket 69 is secured to the side bar 14 of the front frame and extends upwardly and forwardly under the flattened portion 64 of the telescopic bar section 57, where said bracket establishes pivotal connection with the lower pintle end 63 of the pivot block 59. The bar 68 and bracket 69 establish the vertical axis of the pivot block 59 in fixed relation to the corner of the front frame. The rear end of the inner telescopic bar section 58 is pivotally connected to the frame of the rear gang B through a pivot bolt 72 which passes downwardly through openings in the bar section 58. A plate or strap 73 is secured to the side bar 29 of this frame, and has its forward end bent backwardly as indicated at 74, to provide a supporting surface for the rear end of the tubular bar 58. The pivot bolt 72 passes down through openings in the upper and lower portions of the plate 73, and through an opening in the frame bar 29. A similar plate or strap 75, also secured to the frame bar 29, has its front end extending upwardly and forwardly over the top of the tubular draft bar, as indicated at 76, the pivot bolt 72 also passing through an aperture in this upper brace.

The outer telescopic bar section 57 has mounted thereon a latch mechanism, generally indicated at 77, which corresponds in construction and operation to the latch mechanism 55 which is associated with the extensible draft rod 42 at the front end of the implement. In each instance, this latch mechanism comprises a mounting block or bracket 78 which encircles the outer telescopic bar section and is rigidly secured thereto, preferably adjacent to the rear end of the bar section.

A bell crank lever 79 is pivotally supported on the mounting bracket 78, as indicated at 81. Pivotally connected to the short arm of this lever at 82 is a latch pin or plunger 83, which passes inwardly through aligned guide apertures in the bracket 78 and in the outer bar section 57. This pin is adapted to snap into any one of a series of holes 84 provided at spaced points along the inner tubular bar section 58.

A tension spring 85 extending between the latch lever 79 and an arm 86 on the bracket 78 normally tends to force the latch pin 83 downwardly or inwardly into one of the holes 84. A trip rope 87 is connected to the upper end of the latch lever 79, and extends forwardly to the operator's position on the tractor T, the rope passing through a guide bracket 88, rising from the bar 67, in order that the line of pull of the rear end of the rope will always be in a direction effective to trip the lever 79. Referring to Fig. 1, a similar trip rope 89 extends from the lever of the corresponding latch mechanism 55, such trip rope also being passed up to a point on the tractor in convenient position for operation by the driver from his seat on the tractor.

In order to prevent the possibility of accidental separation of the inner and outer telescopic sections of each extensible bar 42 and 56, it is desirable that means be provided for positively limiting the extensible movement between the sections. As shown in Fig. 4, such means comprises a stop rod 91 which is fixedly secured at its front end to the front portion of the outer bar section and which has a limiting stop shoulder 92 at its rear end. The attachment of the front end of such rod to the outer telescopic section may be effected by forming an eye in the end of the rod and then passing a bolt 93 down through the bar section and through said eye.

The front end of the inner telescopic bar section 58 is flanged over as indicated at 94 to seat a ring or collar 95 which engages snugly on the shank portion of the rod 91. The engagement of the stop shoulder 92 against the end of the collar 95 positively stops further extension of the telescopic bar 56. The other telescopic draft bar 42 preferably has this same arrangement of a limiting stop rod 91 therein for preventing the possibility of accidental separation of the two bar sections 48 and 49. The gang angling bar 56 is also preferably provided with a stop for limiting the contraction of such rod, this stop consisting, for example, of a bolt 96 extending transversely through the rear portion of the inner bar section 58 and adapted to be engaged by the rear end of the outer bar section 57. The provision of this stop limits the angle to which the two gangs can be turned or inclined relatively to each other when the harrow is in operating position.

Referring now to the construction of each end bearing 16, and to the construction and arrangement of the dust excluding rings, it will be seen from Fig. 5 that the rotatable element of each end bearing consists of a bearing sleeve 98 which is mounted on the axle rod 11 between the two end disks of the gang. The bore in said sleeve is polygonal to compel rotation thereof with the rod or shaft 11, and the outer surface thereof is cylindrical for rotation in the bearing.

The inner end of the sleeve is formed with a flange or head 99 for bearing against the convex side of the adjacent disk 9. The shaft 11 is extended through the end disk of the series and is provided with a head 101 which seats in a recess formed in an end cap 102 which bears against the outer side of the disk. A spacing sleeve 103 is interposed between the inner side of the disk and the end of the bearing sleeve 19, the latter being recessed into the end of the spacing sleeve. By placing tension on the shaft 11, as by screwing up a nut on the other end thereof, the entire gang of disks and the spacing sleeves are all rigidly clamped together.

The stationary portion of the bearing comprises upper and lower wood blocks 104 and 105 which embrace the metallic bearing sleeve 98, the opposing faces of these wood blocks having matching bearing surfaces therein forming a cylindrical bearing surface for the sleeve 98. The outer surfaces of the blocks are polygonal, as shown in Fig. 4, the upper block 104 seating in a correspondingly formed recess in a U-shaped bearing hanger 106. A plate 107 of polygonal cross-section embraces the under side of the lower bearing block 105. A U-bolt 108 engages under the plate 107 and passes upwardly through the legs of the hanger member 106, the ends of this bolt passing through apertures in the side frame bar and receiving nuts 109 above the same, these nuts rigidly securing the entire bearing in suspended relation below the frame bar.

Disposed at each end of the wood blocks or liners 104—105 are dust excluding rings 111, such rings being of angle cross-section comprising a relatively long longitudinally extending flange and a relatively short inwardly extending flange, as clearly shown in Fig. 5. The ring at the outer side of the bearing engages snugly with the outer annular surface of the spacing sleeve 103 for preventing the entrance of dust or dirt to this side of the bearing. The longitudinal flange of the ring at the inner side of the bearing likewise has snug engagement over a corresponding annular surface 112 formed on the enlarged end portion of the bearing sleeve 98, for preventing the entrance of dust to this end of the bearing. Means is provided for retaining the inwardly extending flange of each ring pressed snugly against the end surfaces of the two woods blocks 104—105 for preventing the entrance of dust or dirt inwardly along the end surfaces of said blocks to the actual bearing surfaces. Such means consists of an expansion ring 113 of the general design illustrated in Fig. 6. Such ring is slit circumferentially at several points to provide tongues or segments 114 which normally tend to press laterally sidewise away from the main body of the ring. Each of these pressure rings 113 is confined in an annular groove 116 adjacent to the dust excluding ring with which it is associated. It will be observed that one of such grooves 116 is formed in the end of the spacing sleeve 103, and the other of such grooves is formed in the enlarged portion 99 of the bearing sleeve, in proximity to the annular surface 112.

The outer wall of each groove constitutes an abutment surface against which the expansion ring reacts in exerting its lateral pressure on the dust excluding ring. The radial flange of each dust excluding ring extends inwardly substantially to the bottom of the aforesaid groove, and the expansion ring 113 presses against this inwardly extending flange, thereby forcing said flange into pressure engagement with the adjacent end surfaces of the wood blocks 104—105, for preventing the entrance of dirt and dust down along these surfaces of the blocks to the cylindrical bearing surfaces. It will hence be seen that each dust excluding ring 111 has its longitudinally extending flange bearing on an annular surface so that dust cannot work inwardly to the bearing under this flange, and also has its radially extending flange pressed against a radial wall at one end of the bearing so that dust cannot work inwardly along the outer side of the ring and thence inwardly to the bearing surfaces along said radial flange. The tension exerted on the shaft 11 in the assembly of the gang compresses the expansion rings 113 in their grooves 116. The end thrust of the disk is borne by a shoulder 117 on the bearing sleeve 98 thrusting against the ends of the wood blocks 104—105, the latter sustaining such thrust by virtue of their rigid clamping to the hanger member 106. Lubricant is introduced to the radial and thrusting surfaces of the bearings through a nipple fitting 118 which screws downwardly through the hanger member 106 and into the upper block 104 for discharging lubricant to the bearing surfaces.

The construction of end bearing above described is employed for supporting the disks of both gangs A and B. The intermediate bearings 26 of both gangs may also be constructed in this same manner.

I shall now describe the general operation of the harrow. When the implement is travelling in transport condition with the axes of both gangs substantially parallel, as shown in Fig. 1, the extensible draft bar 42 has been adjusted to a relatively short effective length, and the gang angling bar 56 has been adjusted to a comparatively long effective length. Both bars are securely held in these adjustments by the engagement of the latch pins 83 in the holes 84, it being understood that the inner telescopic bar 49 of the draft connection 42 has a series of these holes therein substantially similar to the construction of the gang angling bar 56. To place the harrow in an offset, working position, the draft bar 42 is lengthened and the angling bar 56 is shortened; or the gang angling bar 56 is shortened and the draft bar 42 is retained at its original adjustment. For example, the offset position indicated approximately by the full line illustration in Fig. 2 is obtained by shortening the gang angling rod 56 while the draft rod 42 is left in its previous adjustment. To shorten the gang angling bar 56, it is only necessary for the operator to pull on the rope 87, from his position on the tractor, and to then back the tractor, whereupon, the two gangs will angle relatively to each other and the bar 56 will shorten.

The rope 87 is held taut until the gangs have been swung to the desired angle, whereupon the release of the rope will permit the latch pin 83 to snap into the adjacent hole 84 for locking the bar 56 in this desired adjustment. Forward movement of the harrow from this point will result in the rear gang tracking outwardly and carrying the entire harrow outwardly to an offset position where the tendency of the rear gang to track outwardly will be balanced by the tendency of the front gang to track inwardly, whereupon the harrow will remain at this degree of offset. Small adjustments of this offset may be obtained by increasing or decreasing the effective length of the gang angling bar 56, from the previously established adjustment. To increase the offset considerably, the operator pulls on the trip rope 89 of the extensible draft bar 42 and permits this bar to lengthen. The dotted line position in Fig. 2 illustrates the considerable offset which can thus be obtained by lengthening the extensible draft bar 42. For convenience of illustration in this figure, I have shown the tractor shifted inwardly, rather than the implement shifted outwardly, as would actually occur, these two offset positions of the tractor and of the harrow being relative. By adjusting the effective length of the extensible draft bar 42 and/or adjusting the effective length of the gang angling control bar 56, a wide variety of offset adjustments may be obtained.

The tendency of the rear gang to track outwardly and the tendency of the front gang to track inwardly establishes a rotative force in the implement which minimizes side draft on the tractor, notwithstanding the offset position of the harrow.

The restoration of the harrow to transport position is obtained by pulling on the trip rope 87 while traveling straight ahead, the release of the gang angling bar 56 permitting the rear gang B to swing back into parallelism with the front gang A. The length of the stop rod 91 in the gang angling bar is preferably such that relative separation between the two bar sections 57 and 58 will be stopped when the two gangs are in parallelism.

In all working positions of the harrow, the rear gang B will ordinarily assume a more acute angle to the line of advance than the front gang A, such being approximately illustrated in Fig. 2. As previously remarked, this is caused by the fact that the front gang is cutting into unworked soil, whereas the rear gang is cutting into soil which has been partly loosened by the front gang, and hence the two gangs will ordinarily assume these differential angles in establishing equilibrium in the harrow as a unit. In order to obtain proper registration, with the disks of the rear gang splitting the ridges left between the disks of the front gang, notwithstanding the different angles of the two gangs, I dispose the disks of the rear gang further apart than the disks of the front gang, as by employing longer spools 12 between the disks of the rear gang. With the gangs in one particular angular adjustment the disks of the two gangs will accurately register, and I have so proportioned the disk spacing of the rear gang that this condition will occur at that angular adjustment of the gangs which will be most frequently used in harrowing operations.

As the gang angling adjustment is varied from this predetermined adjustment there is a tendency to lose registration. This is particularly true when the two gangs are pivotally connected together at one side of the harrow, or in proximity to the side thereof. I have found that the resulting error in registration can be reduced to an inappreciable quantity for all normal working adjustments of the harrow by placing this pivot axis substantially as shown, i. e., approximately midway between the ends of the rear gang and in close proximity to the axis thereof. Such location of the pivot also has the tendency of balancing the draft forces of one end of the gang against the draft forces of the other end at this centrally located point, thereby making the angling adjustments and the general maneuvering of the harrow easier to perform.

Having thus described my invention, what I claim as new and desire to secure by Letters Patent of the United States is:

1. In a tractor drawn, single tandem disk harrow, the combination of a front gang of disks, a rear gang of disks, means pivotally connecting the two gangs together, and mechanism for determining the angle between said gangs comprising two telescoping bar sections pivotally connected respectively with said front and rear gangs, and latch mechanism releasable from the tractor for normally holding said bar sections against relative telescopic movement.

2. In a tractor drawn, single tandem disk harrow, the combination of a front gang of disks, a rear gang of disks, and an adjustable member for changing the working angle of one of said gangs, said adjustable member comprising an outer tubular bar section, an inner bar section having sliding telescopic movement within said outer bar section, a bracket carried by said outer bar section, a lever pivoted on said bracket, a latch member actuated by said lever and adapted to engage in spaced holes along said inner bar section, and means for tripping said lever from the tractor.

3. In a tractor drawn, single tandem disk harrow, the combination of a front gang of disks, a rear gang of disks, and an adjustable member for changing the working angle of one of said gangs, said adjustable member comprising an outer tubular bar section, an inner bar section having sliding telescopic movement within said outer bar section, a bracket carried by said outer bar section, a lever pivoted on said bracket, a latch member actuated by said lever and adapted to engage in spaced holes along said inner bar section, means for tripping said lever, and means for limiting the relative separating movement between said bar sections.

4. In a tractor drawn, single tandem disk harrow, the combination of a front gang of disks, a rear gang of disks, a pivot connecting said front and rear gangs and disposed intermediate the ends of said rear gang, draft means, and an adjustable connection, independent of said draft means, extending between the end portions of said gangs at one side of the harrow for determining the angle between the gangs.

5. In a tractor drawn, single tandem disk harrow, the combination of a front gang of disks, a rear gang of disks, front and rear frames for said gangs, draft means adapted to pull the harrow in offset relation to the tractor, a pivot connecting said front and rear frames, said pivot being disposed approximately midway between the ends of said rear gang, and an adjustable connection separate from said draft means extending between said frames for determining the angle between said gangs, said adjustable connection being disposed on the inner side of said pivot with respect to the offset position which the harrow is adapted to assume relative to the tractor.

6. In a tractor drawn, single tandem disk harrow, the combination of a front gang of disks, a rear gang of disks, front and rear frames for said gangs, draft means adapted to pull the harrow in offset relation to the tractor, an apex-shaped frame extension projecting rearwardly from said front frame, a pivot connecting said frame extension with said rear frame, said pivot being disposed in closer proximity to the axis of said rear gang than to the axis of said front gang, and being disposed intermediate the ends of said rear gang, and an adjustable connection for determining the angle between the gangs, said adjustable connection extending between the inner portions of said frames with respect to the offset position which the harrow is adapted to assume relative to the tractor and being adjustable relatively to said draft means.

7. In a disk harrow of the class described, the combination of a front gang of disks, a rear gang of disks, front and rear frames for said gangs, a vertical pivot pin for pivotally connecting the frames together, a plate extending from one frame and looped around the intermediate portion of the pin shank, and a plate extending from the other frame and having portions looped around the upper and lower shank portions of said pin.

8. In a disk harrow, the combination of a gang of disks mounted on a rotating shaft, a frame for said gang, a bracket on said frame, a wood bearing block carried by said bracket, a bearing sleeve on said shaft having bearing support in said wood block, annular surfaces rotating with said shaft at each end of said block, said surfaces having annular grooves therein adjacent to said block, dust excluding rings at each end of said block, each of said rings comprising a longitudinally extending flange having engagement with the adjacent annular surface and comprising an inwardly extending flange disposed in the adjacent grove, and expansion rings confined in said grooves and comprising resilient circumferential tongues pressing laterally against the radially extending flanges of said dust excluding rings for holding said latter flanges pressed against the ends of said bearing block.

9. In a tractor drawn, single tandem disk harrow, the combination of a front gang of disks, a rear gang of disks, the disks of one of said gangs being spaced further apart than the disks of the other gang, front and rear frames for said gangs, adjustable draft means adapted to pull the harrow in offset relation to the tractor, a pivot connecting said front and rear frames, said pivot being disposed approximately midway between the ends of said rear gang, and an adjustable connection extending between said frames for determining the angle between said gangs, said adjustable connection being disposed on the inner side of said pivot with respect to the offset position which the harrow is adapted to assume relative to the tractor, and being adjustable independently of adjustments of said draft means.

10. In a tractor drawn, single tandem disk harrow, the combination of a front gang of disks, a rear gang of disks, the disks of one of said gangs being spaced further apart than the disks of the other gang, means pivotally connecting the two gangs together, and mechanism for determining the angle between said gangs comprising two telescoping bar sections pivotally connected respectively with said front and rear gangs, and latch mechanism releasable from the tractor for normally holding said bar sections against relative telescopic movement.

11. In a tractor drawn, single tandem disk harrow, the combination of a front gang of disks, a rear gang of disks, the disks of one of said gangs being spaced further apart than the disks of the other gang, a pivot connecting said gangs, said pivot being disposed intermediate the ends of one of said gangs, and draft means for the harrow comprising a draft bar of fixed length extending forwardly from one end of the front gang, a draft bar of adjustable length extending forwardly from the other end of said front gang, said draft bars being adapted to be coupled to the tractor and being capable of pulling the harrow in offset relation to the tractor, said adjustable draft bar comprising two telescoping bar sections, and latch mechanism for normally holding said bar sections against relative telescopic movement.

12. In a tractor drawn, single tandem disk harrow, the combination of a front gang of disks, a rear gang of disks, the disks of one of said gangs being spaced further apart than the disks of the other gang, a pivot connecting said gangs, said pivot being disposed intermediate the ends of one of said gangs, and an adjustable member for changing the working angle of one of said gangs, said adjustable member comprising an outer tubular bar section, an inner bar section having sliding telescopic movement within said outer bar section, a bracket carried by said outer bar section, a lever pivoted on said bracket, a latch member actuated by said lever and adapted to engage in spaced holes along said inner bar section, and means for tripping said lever from the tractor.

13. In a tractor drawn, single tandem disk harrow, the combination of a front gang of disks, a rear gang of disks, a pivot connecting said gangs, said pivot being disposed intermediate the ends of one of said gangs, and an adjustable member for changing the working angle of one of said gangs, said adjustable member comprising an outer tubular bar section, an inner bar section having sliding telescopic movement within said outer bar section, a bracket carried by said outer bar section, a lever pivoted on said bracket, a latch member actuated by said lever and adapted to engage in spaced holes along said inner bar section, and means for tripping said lever from the tractor.

14. In a tractor drawn, single tandem disk harrow, the combination of a front gang of disks, a rear gang of disks, a pivot connecting said gangs, said pivot being disposed intermediate the ends of one of said gangs, adjustable draft means adapted to pull the harrow in adjusted angular relation with respect to the tractor, latch means releasable from the tractor for effecting an adjustment of said draft means, and a separate adjusting mechanism for adjusting the angle between said gangs, operatively connected with both gangs independently of said draft means and operable to adjust the angular relation between said gangs independently of adjustment of said draft means.

15. In a tractor drawn, single tandem disk harrow, the combination of a front gang of disks, a rear gang of disks, a pivot connecting said gangs, said pivot being disposed intermediate the end of one of said gangs, means adjustably connecting the two gangs together, draft means adapted to pull the harrow in offset relation to the tractor, said draft means comprising a normally locked member, the effective length of which is adapted to be adjusted to vary said offset relation, and holding means therefor actuatable to release said member to permit increasing or decreasing the effective length thereof under the power of the tractor independently of any change in the angular relation between the gangs.

16. In a disk harrow of the class described, the combination of a front gang of disks, a rear gang of disks, means adjustably connecting the two gangs together for angular adjustment, an adjustable connection extending between said gangs for determining the angle therebetween, draft means for the harrow comprising a member movable endwise relatively to the harrow, a releasable latch for controlling the adjustable connection between said gangs, and a separate releasable latch for controlling the endwise movement of said draft member.

17. In a tractor drawn, single tandem disk harrow, the combination of a front gang of disks, a rear gang of disks, means connecting said gangs intermediate their ends for relative horizontal swinging movement, draft means connected with said front gang whereby draft force may be applied to move said front gang about said connecting means, an extensible angle control member connecting said gangs adjacent one end for determining the angular relation of said gangs, and a latch for holding said member in different positions of adjustment.

18. In a tractor drawn offset harrow of the class described, the combination of a front gang of disks, a rear gang of disks, draft means for connecting the harrow with a tractor, said draft means being adjustable to dispose the hitch point at any one of a plurality of laterally spaced points, said front and rear gangs of disks being connected so as to be drawn at different angles with respect to the line of advance, the disks on said gangs being differentially spaced, the distance between adjacent disks on one gang projected on a perpendicular to the line of advance being substantially the same as the distance between adjacent disks on the other gang projected on the same perpendicular, a pivot connecting said gangs, said pivot being disposed intermediate the ends of one of said gangs, and means for adjusting said draft means to adjust the offset relation of the harrow relatively to the tractor.

19. In a tractor drawn, single tandem disk harrow, the combination of a front gang of disks, a rear gang of disks, draft means for connecting the harrow with a tractor, said draft means being adjustable to dispose the hitch point at any one of a plurality of laterally spaced points, said gangs of disks being connected so that said rear gang is drawn at a greater angle with respect to the line of advance than said front gang, the disks on said rear gang being spaced further apart than the disks on said front gang whereby the distance between adjacent disks on said rear gang projected on a perpendicular to the line of advance is substantially the same as the distance between adjacent disks on the front gang projected on the same perpendicular, a pivot connecting said gangs, said pivot being disposed intermediate the ends of said rear gang and in relatively close proximity to the axis thereof, and means for adjusting said draft means to adjust the offset relation of the harrow relatively to the tractor.

20. A harrow comprising a front gang of disks and a rear gang of disks connected so as to be drawn at different angles with respect to the line of advance, the disks on said gangs being differentially spaced, the distance between adjacent disks on one gang projected on a perpendicular to the line of advance being substantially the same as the distance between adjacent disks on the other gang projected on the same perpendicular.

21. In a disk harrow of the class described, the combination of a front gang of disks, a rear gang of disks, means adjustably connecting the two gangs together for angular adjustment about substantially a point located between the ends of the gangs, an adjustable connection extending between said gangs for determining the angle therebetween, draft means for the harrow comprising a member movable endwise relatively to the harrow, a releasable latch for controlling the adjustable connection between said gangs, and a separate releasable latch for controlling the endwise movement of said draft member.

22. In a tractor drawn, a single tandem offset harrow, the combination of a front gang of disks, a rear gang of disks, front and rear frames for said gangs, the disks of the rear gang being spaced farther apart than the disks of the front gang so that the distance between adjacent disks on one gang projected on a perpendicular to the line of advance is substantially the same as the distance between adjacent disks on the other gang projected on the same perpendicular when the rear gang is disposed at a greater angle to the line of travel of the implement than the front gang, a pivot connecting said front and rear frames, said pivot being disposed approximately midway between the ends of said rear gang and in closer proximity to the axis thereof than to the axis of said front gang, an adjustable member for determining the relative angle between the gangs around the axis of said pivot, an adjustable draft member for determining the offset position of the harrow with respect to the tractor, and means for effecting adjustment of both of said members from the tractor whereby to arrange the rear gang for operation at a greater angle to the line of advance than said front gang.

CHARLES H. WHITE.